April 30, 1963    G. LISSAC    3,087,285
MACHINE FOR SHAPING THE EDGES OF SPECTACLE GLASSES
Filed March 23, 1961    4 Sheets-Sheet 3

INVENTOR
GEORGES LISSAC
By Irwin S. Thompson
ATTY

April 30, 1963  G. LISSAC  3,087,285
MACHINE FOR SHAPING THE EDGES OF SPECTACLE GLASSES
Filed March 23, 1961  4 Sheets-Sheet 4
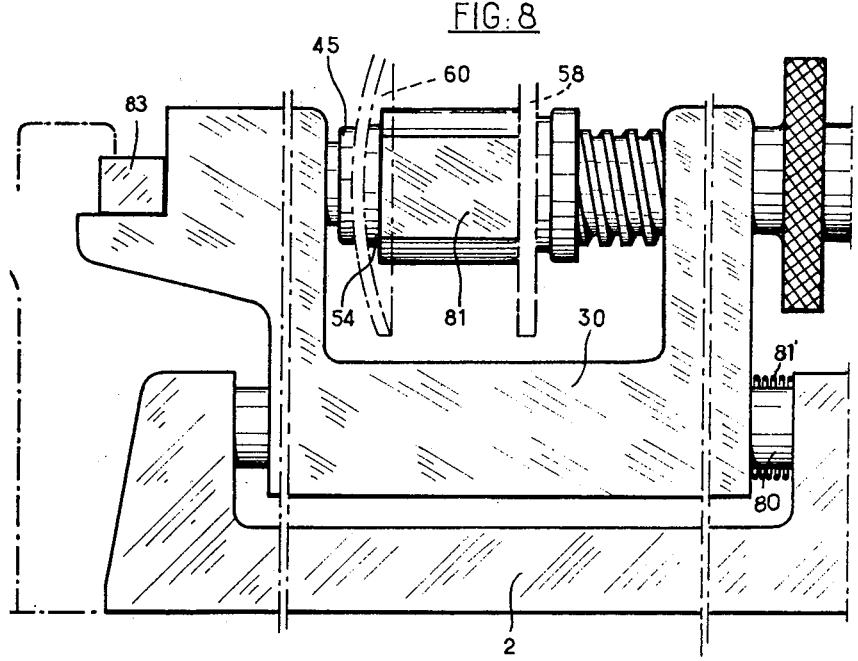
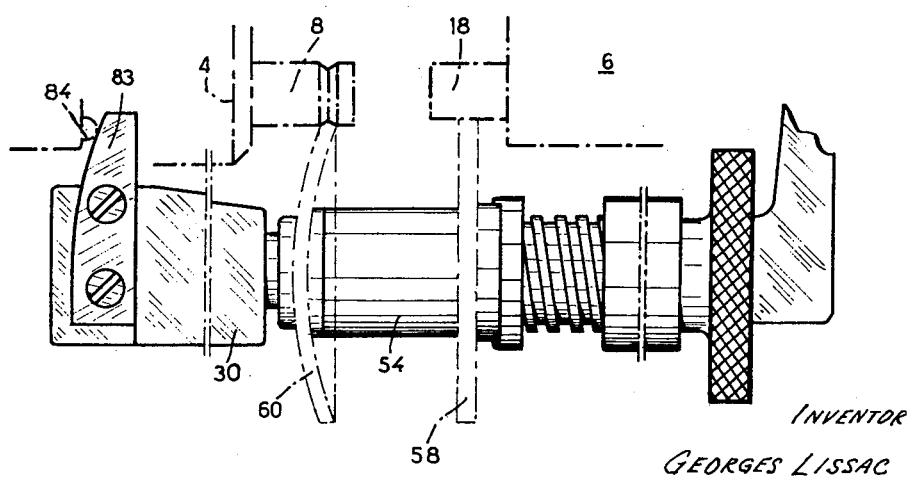
INVENTOR
GEORGES LISSAC
By Irvin S. Thompson
ATTY.

United States Patent Office 3,087,285
Patented Apr. 30, 1963

3,087,285
MACHINE FOR SHAPING THE EDGES OF
SPECTACLE GLASSES
Georges Lissac, 8 Ave. Raphael, Paris 16e, France
Filed Mar. 23, 1961, Ser. No. 97,816
Claims priority, application France Apr. 9, 1960
3 Claims. (Cl. 51—101)

My invention has for its object improvements in the trimming or edging of the edges of spectacle glasses and it refers chiefly to a machine for shaping or trimming the edges of such glasses.

Said improvements are naturally applicable both to mineral correcting glasses, as also to ophthalmic lenses made of organic material.

My improved machine for trimming spectacle lenses consists chiefly in bringing the lens into contact with a rotary tool and shifting it with reference to said tool so that its axis may remain constantly parallel with that of the tool and that while the said tool engages the lens or glass, a predetermined area of the tool may remain constantly engaged over a surface of revolution coaxial with the lens.

According to a preferred embodiment of the machine, the predetermined area of the tool is constituted by the cutting area of the latter, while the surface of revolution is located within the thickness of the lens.

With such an arrangement, it is possible to provide along the edge of a lens a groove, for instance, the tool serving for this purpose being provided with a correspondingly shaped projection, so that said groove may be suitably positioned within the thickness of the edge of the lens, the outer surface of said edge being furthermore parallel with the axis of the lens throughout the periphery of the latter.

The machine for carrying into effect my invention I will describe hereinafter, by way of examples, certain embodiments, reference being made to the accompanying drawings, wherein:

FIGS. 8 and 9 show a modified form of the machine.

Figure 1:
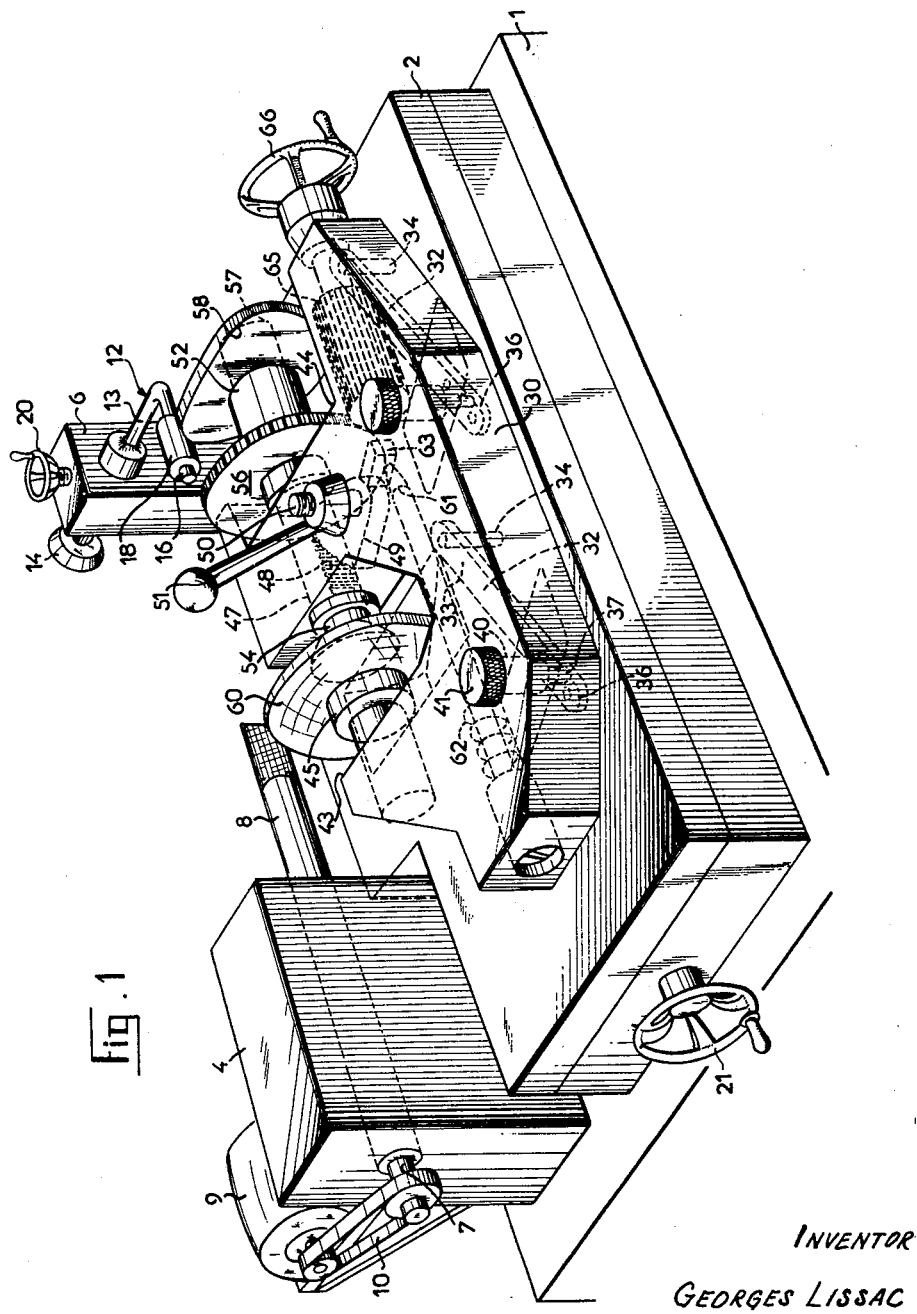
FIGS. 1 and 2 illustrate in perspective views a machine for trimming spectacle glasses in accordance with my invention, said figures showing respectively the machine complete and deprived of certain parts.
Figure 2:
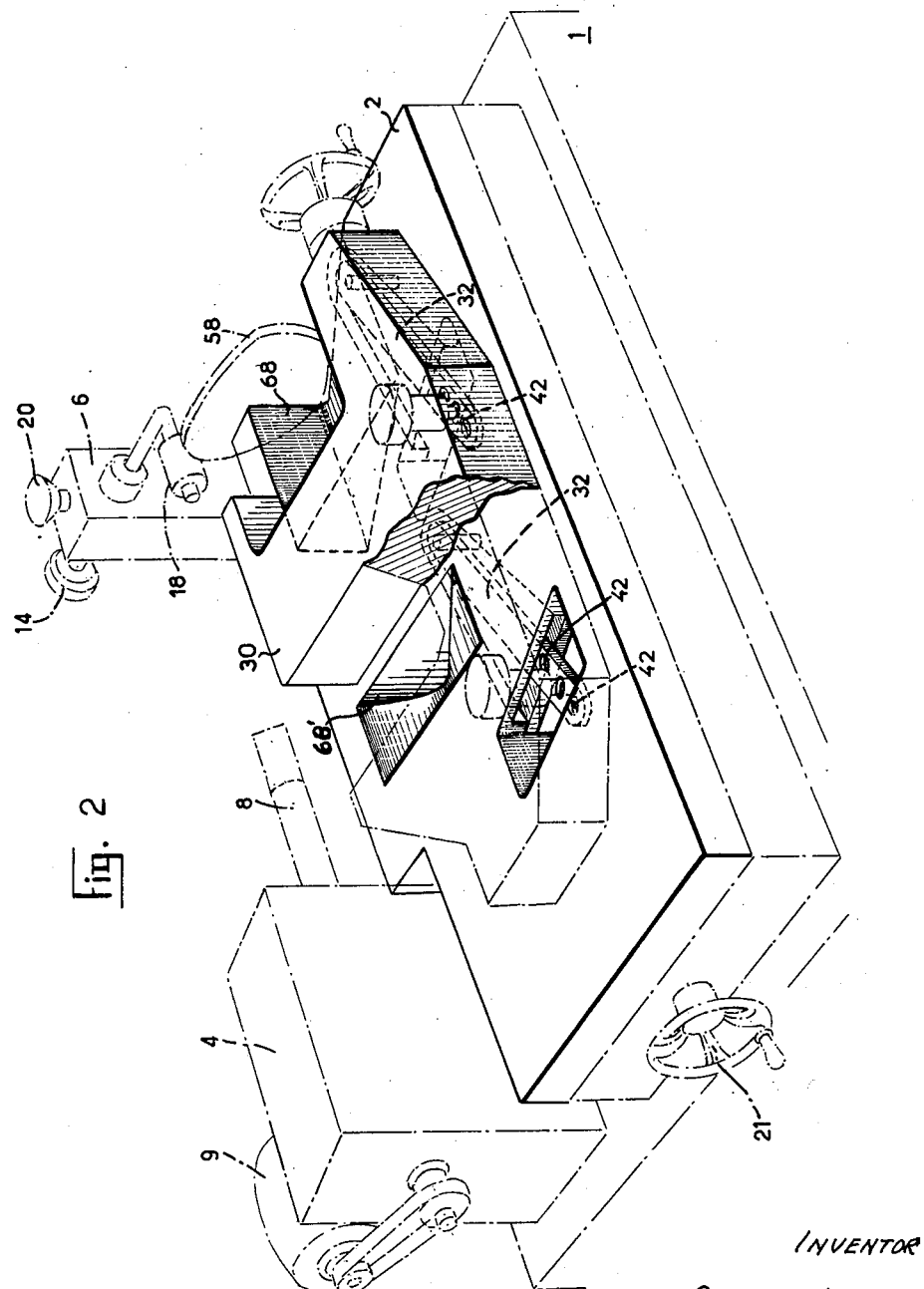

The machine illustrated in FIGS. 1 and 2 includes a pedestal 1 over which a table 2 rests through the agency of slideways which are not illustrated. Said pedestal carries furthermore a tool holder head 4 and a stop-carrying block 6 in transverse registry with said head.

The tool holder head 4 is provided with suitable bearings for a spindle 7 to the end of which may be secured various machining tools 8 such as a rotary cutter or a grinding wheel, said spindle being driven into rotation, for instance by means of an electric motor 9 through the agency of a belt 10. The stop-carrying block 6 is provided with a bent member 12, of which one arm, 13, is adapted to slide across said block under the action of a micrometric system 14 to either side of a mean position for which the other arm, 16, of the member 12 is aligned with the tool-carrying spindle 7. Said arm 16 is adapted to carry sleeve-shaped stops 18 of different diameters. The block 6 is provided furthermore with an arrangement for locking in position the member 12, said locking arrangement being controlled by a handwheel 20.

The slideways for the table 2 as referred to hereinabove extend in parallelism with the spindle 7 and adjusting means allow shifting the table along said slideways. Only the handwheel 21 controlling said means is illustrated in FIGS. 1 and 2.

A carriage 30 which is recessed so as to carry various elements to be described hereinafter, is mounted over the table 2 and is pivotally secured to the latter through the agency of two similar parallel links 32. Each of said links is pivotally carried at one of its ends 33 by a vertical pivot 34 rigid with the table, while its other end 36 is similarly carried by a vertical pivot 37 rigid with the carriage 30. Each of the pivots 37 is carried at the end of a removable rod 40 housed inside a suitable recess of the table and including a knurled head 41, so as to allow its easy removal and setting in position.

The pivots 37 engage each an opening 42 corresponding thereto in the corresponding link 32, each link being provided, for instance, with a series of such openings 42 located at different distances from the pivot 34 and engaged selectively by the pivot 37.

The table 2 is obviously recessed so as to allow the passage of the links through it and their free shifting.

The mounting is performed in a manner such that for each of the connecting links, the distance separating the pivot 37 from the pivot 34 may be the same, said four pivots forming consequently the apices of a deformable parallelogram. Thus, the carriage 30 may be shifted in parallelism with its own direction over the table 2, while retaining an angular setting which is always the same with reference to said table.

In the part of the carriage facing the tool 8 and the stop 18, there are provided two deep notches, respectively shown at 43 and 44 and arranged respectively in registry with the tool and the stop.

The end of the carriage located in registry with the tool holder head 4 is provided with a thrust bearing 45 projecting into the notch 43 and the axis of rotation of which is parallel with the axis of the tool 8. In the part of the carriage separating the two notches 43 and 44, there is provided in alignment with the thrust bearing 45 a bore connecting said two notches. A sleeve 47 is adapted to slide without any possibility of rotation inside said bore and it is provided along a generating line with a rack 48 engaging the teeth of a toothed sector 49. The latter is revolvably carried by a vertical spindle 50 fitted on the carriage and it may be controlled through the agency of an oblique lever 51 rigid with said spindle. Inside the sleeve 47, there is revolvably carried a shaft 52 which is prevented by suitable stops from being shifted axially inside said sleeve. The part of said shaft engaging the notch 43 carries a member 54 adapted to hold in position the lens or glass 60 to be machined, while the other part of said shaft engaging the notch 44 carries a toothed wheel 56 and the end of said shaft beyond said wheel carries a bearing 57 for the securing of a template 58 of a suitable desired outline.

The sleeve 47 is urged elastically towards the thrust bearing 45 by a pusher member 61 urged by a spring 62 against a tail-piece 63 carried by the sector 49.

The member 54 holding in position the lens 60 to be machined may be constituted by a pneumatic suction cup engaging the lens, or else, by an annulus of some elastic material, in which case the lens 60 is clamped between said annulus and another annulus of a similar nature carried by the thrust bearing 45.

The pinion 56 meshes with an elongated gear 65 revolvably carried by the carriage 30 and the rotation of which is controlled by a handwheel 66. The length of said gear 65 is such that the pinion 56 remains engaged therewith, whatever may be the axial shifting of the sleeve 47, that is: whatever may be the thickness of the lens 60 introduced into the machine.

It will be remarked that, in order to allow a free rotation of the lens 60, on the one hand, of the toothed wheel 56 and of the template 58, on the other hand, there are provided inside the table 2 and in registry with said parts corresponding recessed shown at 68 and 68'.

The operation of the machine described is as follows:

The lens to be machined is fitted between the thrust bearing 45 and the member 54 which is to hold it in position and there is secured to the end of the shaft 52 the selected template, the reference axes of the lens and of the template coinciding.

There is also positioned a tool 8 suiting the work to be executed and there is fitted over the arm 16 of the bent member 13 lying in alignment with the tool 8 a sleeve-shaped stop 18, the diameter of which is equal to that of said tool if it is desired for the machine lens to be given the accurate size of the template as disclosed hereinafter.

The length of the links 32 between the pivots 37 and 34 is adjusted through the proper selection of the openings 42 housing the pivots 37, so that the length of the links may be equal or at least substantially equal to the radius of the meniscus of the lens 60. It will be remarked, from this standpoint, that the ends of the links facing the template being those which are rigid with the table 2, the convex part of the meniscus should face said template.

The periphery of the lens to be machined is then brought into engagement with the tool 8 and the table 2 is shifted through the agency of the handwheel 21, so as to bring the edge of the lens 60 into registry with the operative section of the tool 8.

After starting the tool spindle 7 into rotation, it is sufficient to urge the lens to be machined against said tool, while causing it to revolve, as provided by operation of the handwheel 66.

The engagement of the tool into the lens material is naturally limited to the desired outline which is that of the template 58, this limitation being provided by the contact between the template and the stop 18 and the machining being terminated when all the points of the periphery of the template have been brought into contact with said stop.

Furthermore, by reason of the arrangement of the links 32, it is always the same area of the tool which engages the edge of the lens, whatever may be the spacing between the tool and the center of said lens, since, when it moves towards the tool, the carriage moves along an arc of a circle, the radius of which is equal to that of the meniscus of the lens. It should be also remarked that this shifting of the carriage is obtained in parallelism with a stationary direction, the axis of the tool remaining constantly in parallelism with the axis of the lens.

With such an arrangement, it is possible, by resorting to suitable tools, to give the periphery of the lenses very different cross-sectional shapes.

It should also be mentional that, by providing the arm 16 with different stops 18, so as to obtain abutment diameters which are larger or smaller than the diameter of the tool which is being used, and is coaxial with the stop, the size of the machined lens may be reduced or increased with reference to the template, while retaining perfect geometrical similarity in outline between the lens and the template.

In order to obtain with a high accuracy any desired size, it is possible to slightly shift out of center by a few tenths of a millimeter the arm 16 with reference to the tool 8, through the agency of the micrometric system 14 described hereinabove, after which it is blocked in the selected position by operation of the handwheel 20. Said operation, within the limits of a few tenths of a millimeter, has no action whatever on the similarity between the shape to be considered.

FIGS. 3 to 6 illustrate various examples of a lens-trimming which may be executed with my improved machine, except, of course, a mere trimming along a cylindrical surface which may be easily performed with a mere grinding wheel or cutting wheel having a flat edge, the cylindrical surface of the lens edge being parallel throughout the periphery of the lens or glass with the axis of the latter.

Figure 3:
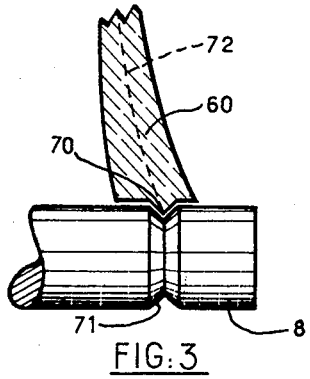
FIGS. 3 to 6 show various outlines for spectacle glasses executed in accordance with my improved machine.

In FIG. 3, there is provided along the periphery of the glass 60 a peripheral rib 70. The tool 8, which is single in this case, includes for this purpose a peripheral groove 71 of a corresponding outline.

It will be remarked that, with the arrangement described, if the rib 70 is arranged centrally in the medial plane of the lens illustrated at 72 in FIG. 3, this centering is maintained throughout operation of the tool, whatever may be the distance separating the axis of the lens from the tool.

Figure 5:
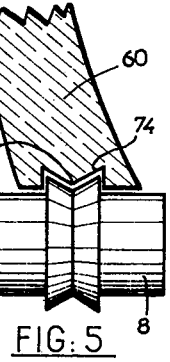
Figure 4:
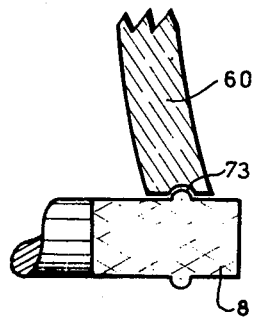
Figure 6:
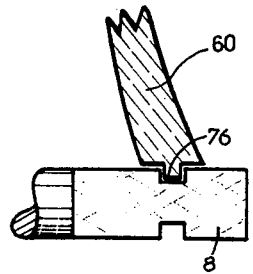

It is also possible to give the tool the shape illustrated in FIGS. 4 to 6, which allows executing respectively a simple groove 73 for the housing of a surrounding wire, a groove 74 provided with a central projecting rib 75 which allows fitting therein a bezel, a rib 76 having a rectangular cross-section, and so on.

The tools may be, according to the case, grinding wheels for the grinding of mineral glasses, or else, cutting wheels, or knives having a semi-circular cross-section, as illustrated in FIGS. 4 and 6 for the execution of ophthalmic lenses made of synthetic organic material.

Figure 7:
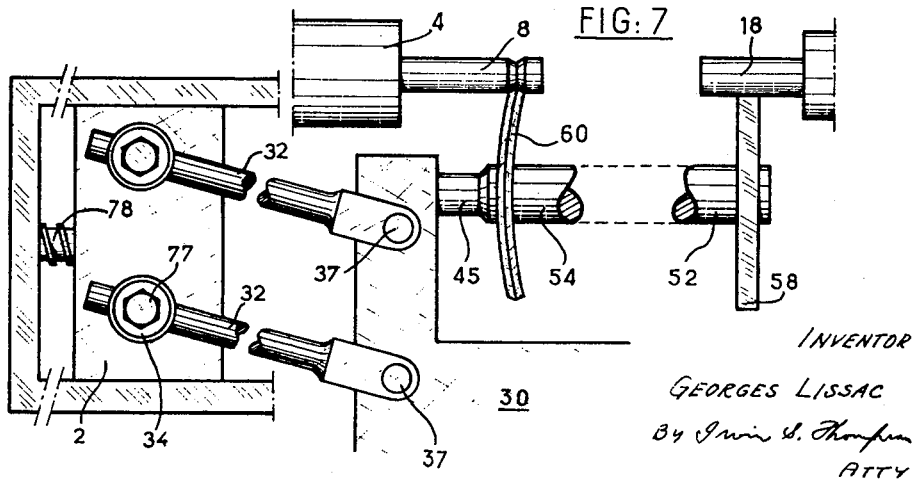
FIG. 7 shows a further embodiment of a machine according to my invention.

Another embodiment of my improved machine is illustrated diagrammatically in FIG. 7. In said machine, there is provided, as precedingly, a head 4 holding a tool 8 in alignment with which there is provided a stop 18. The lens 60 to be machined is fitted between the thrust bearing 45 and a rotary shaft 52 to the opposite end of which is secured a template 58, the whole arrangement being mounted on a carriage 30. Said carriage 30 is connected with a table 2 through two pivotal links 32, the ends of which are pivotally secured to the carriage and to the table by the pivots 37 and 34.

In the embodiment illustrated in FIG. 7, the arms of the links may slide through extensions of the pivots 34 and are locked by means of nuts 77 to the desired length, which allows a continuous adjustment of the length of the arms of the links in direct relationship with the average radius of curvature of the lens.

It is possible to provide for a longitudinal movement of the table with reference to the pedestal carrying the head 4 with a view to bringing the edge of the lens into registry with the tool, said movement being performed, for instance, in a conventional manner by means of a grub screw 78.

In FIGS. 8 and 9, there is illustrated a further embodiment of the machine which includes a table 2 on which is mounted a horizontal spindel 80. A carriage 30 is adapted to rock round said spindle and to be shifted axially along the latter. Said carriage is provided with means for holding the lens to be shaped 60, said lens being held, as in the case of the precedingly described machines, between a thrust bearing 45 and a member 54 fitted at the end of a spindle 81 parrallel with the spindle 80; said spindle 81 carries also a template 58 of a suitable outline.

The table 2 also carries a tool holder 4 for a tool 8, the axis of which is parallel with the spindel 80 and which lies in the path of the lens 60, a stop 18 coaxial with said tool being also carried by the table.

Upon rocking of the carriage 30 round the spindle 80, it is thus possible to bring the edge of the lens 60 into registry with the tool, the engagement of said tool into the lens being limited by the abutment of the edge of the template 58 against the stop 18.

The guiding of said lens, which is necessary for constraining a predetermined area of the tool to lie, during the operation of the tool, in registry with the edge of the lens, is ensured, in the present case, by a cam 83 of a suitable outline, which is secured to the carriage 30 and engaged by a projection 84 rigid with the table. The cam 83 is held in contact with projection 84 through the sliding of the carriage along the spindle 80; a spring 81' holds the carriage in contact with the projection 84.

As a consequence of these various arrangements, it is possible, as already disclosed, to edge or shape the edges of the spectacle glasses, said glasses being indifferently of a mineral or organic origin, bevels or grooves being provided along said edges and the ridges of such bevels or the bottom lines of such grooves being formed on surfaces previously defined in direct relationship with the radius of the meniscus formed by the glass. It is possible to resort to a part spherical surface which may suit all conventional correcting glasses, the bevel or groove formed along such surfaces being correctly located along the edge of the trimmed glass, this allows using a single type of frame of a predetermined camber for the fitting of glasses thus trimmed.

A further advantage of my improved machines consists in that they allow the use of tools of a reduced diameter in contradistinction with conventional machines, whereby the execution of the bevels may be performed without any deformation, even in the areas of a large curvature along the periphery of the glass.

What I claim is:

1. An arrangement for edging spectacle lenses, comprising a tool, means driving said tool into rotation round a stationary axis, a stationary table having a flat face, a carriage slidably carried by the table and in permanent contact with said flat face, a shaft revolvably carried by said carriage and provided with means for fastening the lens to be edged, the lens axis being coaxial with the axis of said shaft, two parallel links of equal lengths pivotally secured to the table and to the carriage and forming a a parallel link motion connecting the table with the carriage and holding the lens axis in parallelism with the tool axis.

2. An arrangement for edging spectacle lenses, comprising a tool, means driving said tool into rotation round a stationary axis, a stationary table having a flat face, a carriage slidably carried by the table and in permanent contact with said flat face, a shaft revolvably carried by said carriage and provided with means for fastening the lens to be edged, the lens axis being coaxial with the axis of said shaft, two parallel links of equal adjustable lengths pivotally secured to the table and to the carriage and forming a parallel link motion connecting the table with the carriage and holding the lens axis in parallelism with the tool axis, the lens being in contacting relationship with the tool during rotation of the shaft.

3. An arrangement for edging spectacle lenses comprising a tool, means for driving said tool into rotation round a stationary axis, a stationary table, a carriage slidably carried by the table, a shaft revolvably carried by said carriage and carrying the lens to be edged, two parallel links of equal lengths pivotally secured to the table and to the carriage and forming a parallel link motion connecting the table with the carriage and holding the lens axis in parallelism with the tool axis, means for adjusting the lengths of said links, a template carried by the shaft, said template having a peripheric outline similar to that of the lens to be edged and a stop adapted to be fitted in alignment or substantially in alignment with the rotary tool in registry with the template to be engaged by the periphery of the latter during rotation of the shaft.

References Cited in the file of this patent

UNITED STATES PATENTS

| | | |
|---|---|---|
| 1,227,243 | Bugbee | May 22, 1917 |
| 1,254,253 | Marchant | Jan. 22, 1918 |
| 1,467,308 | Clement et al. | Sept. 11, 1923 |
| 1,636,469 | Fisher | July 19, 1927 |
| 2,151,509 | Goddu | Mar. 21, 1939 |
| 2,612,734 | Taig | Oct. 7, 1952 |